Patented Oct. 11, 1938

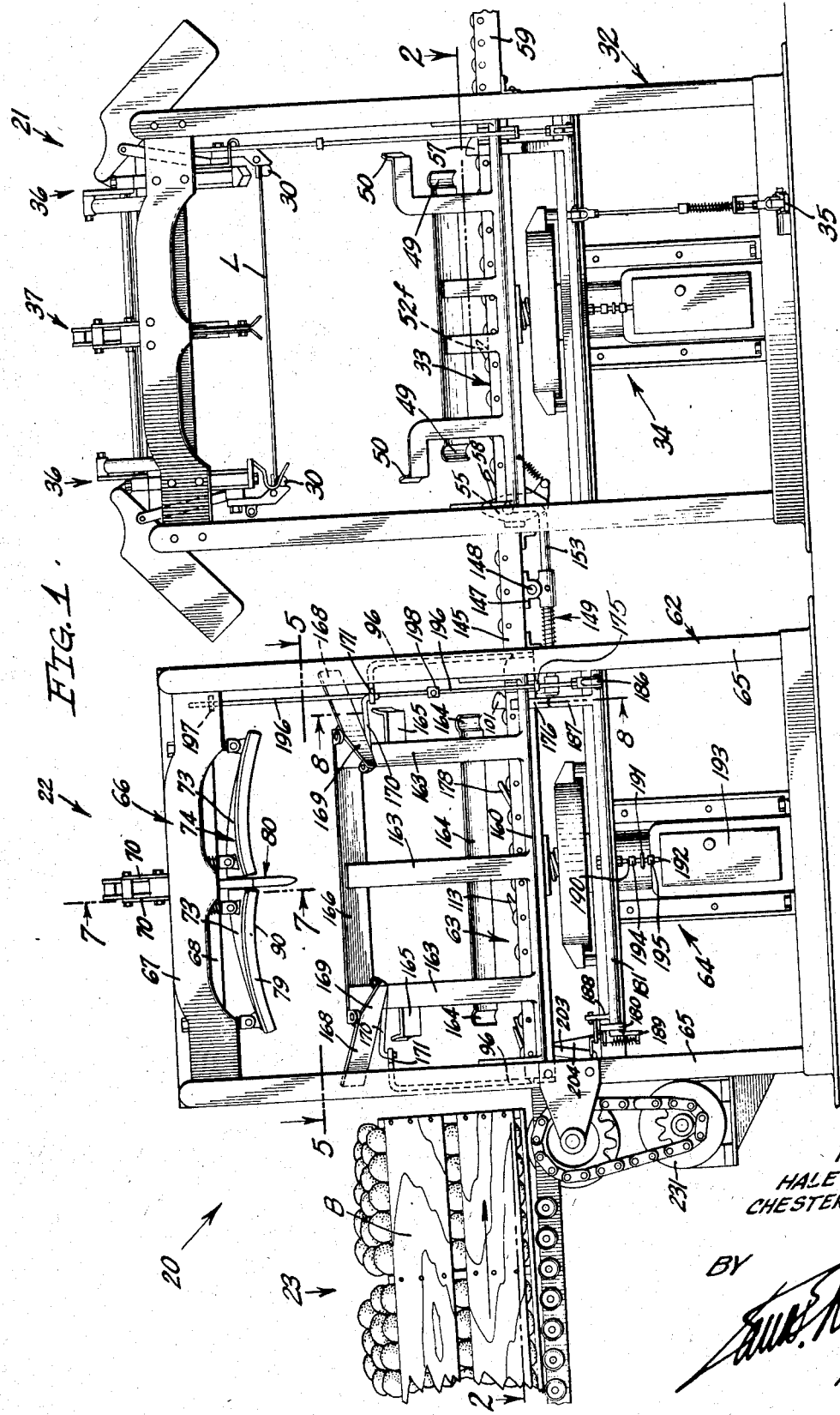

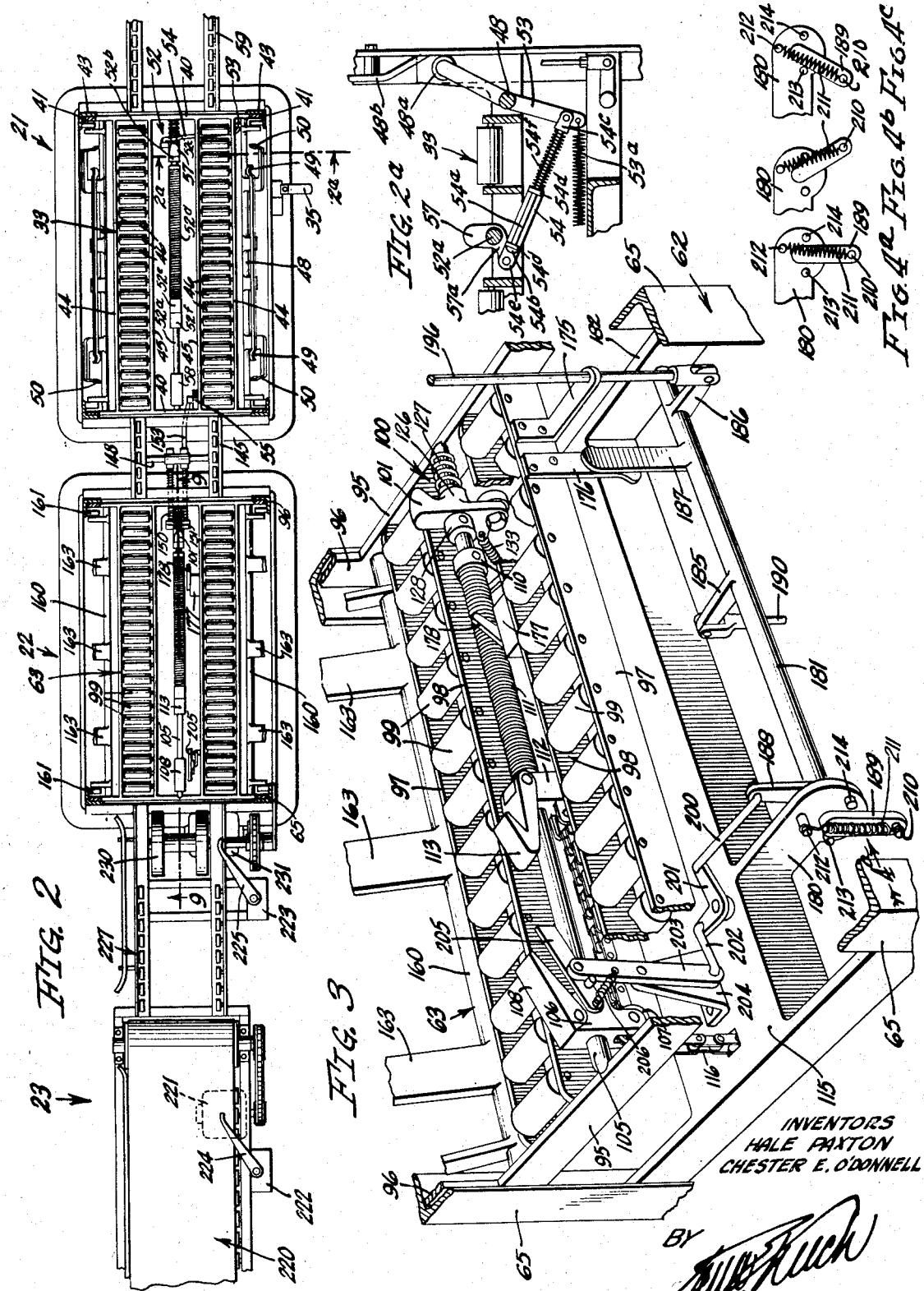

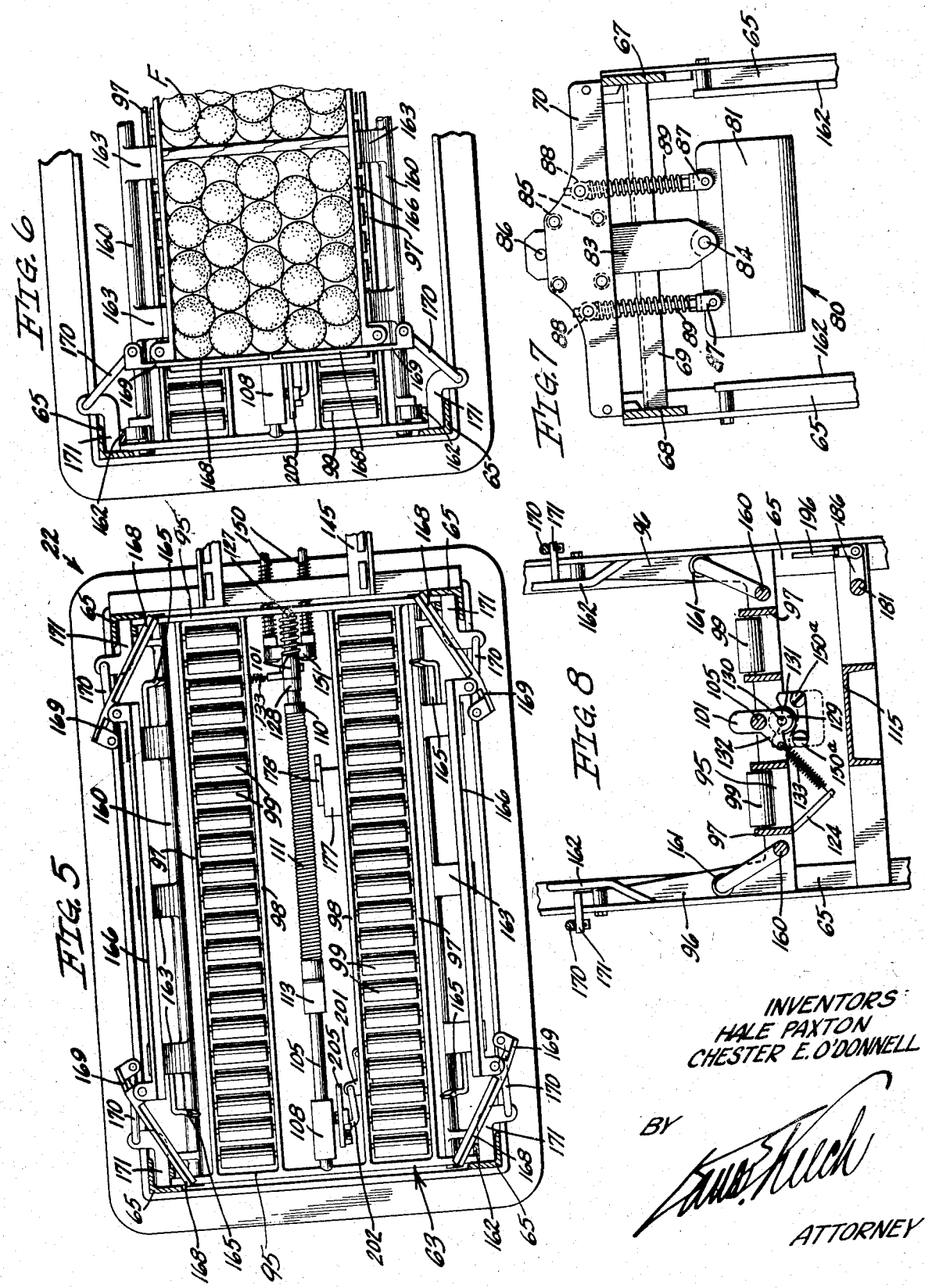

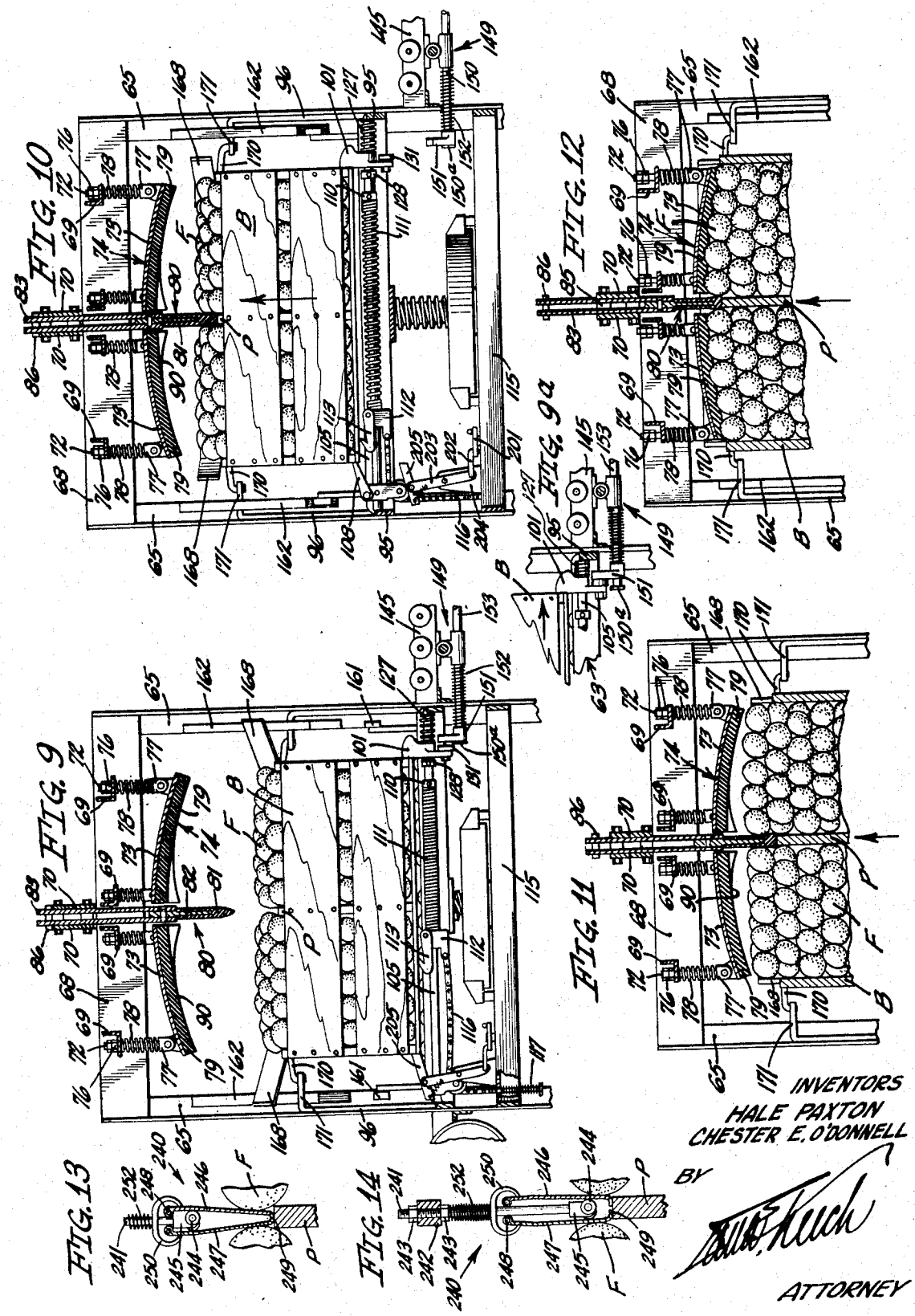

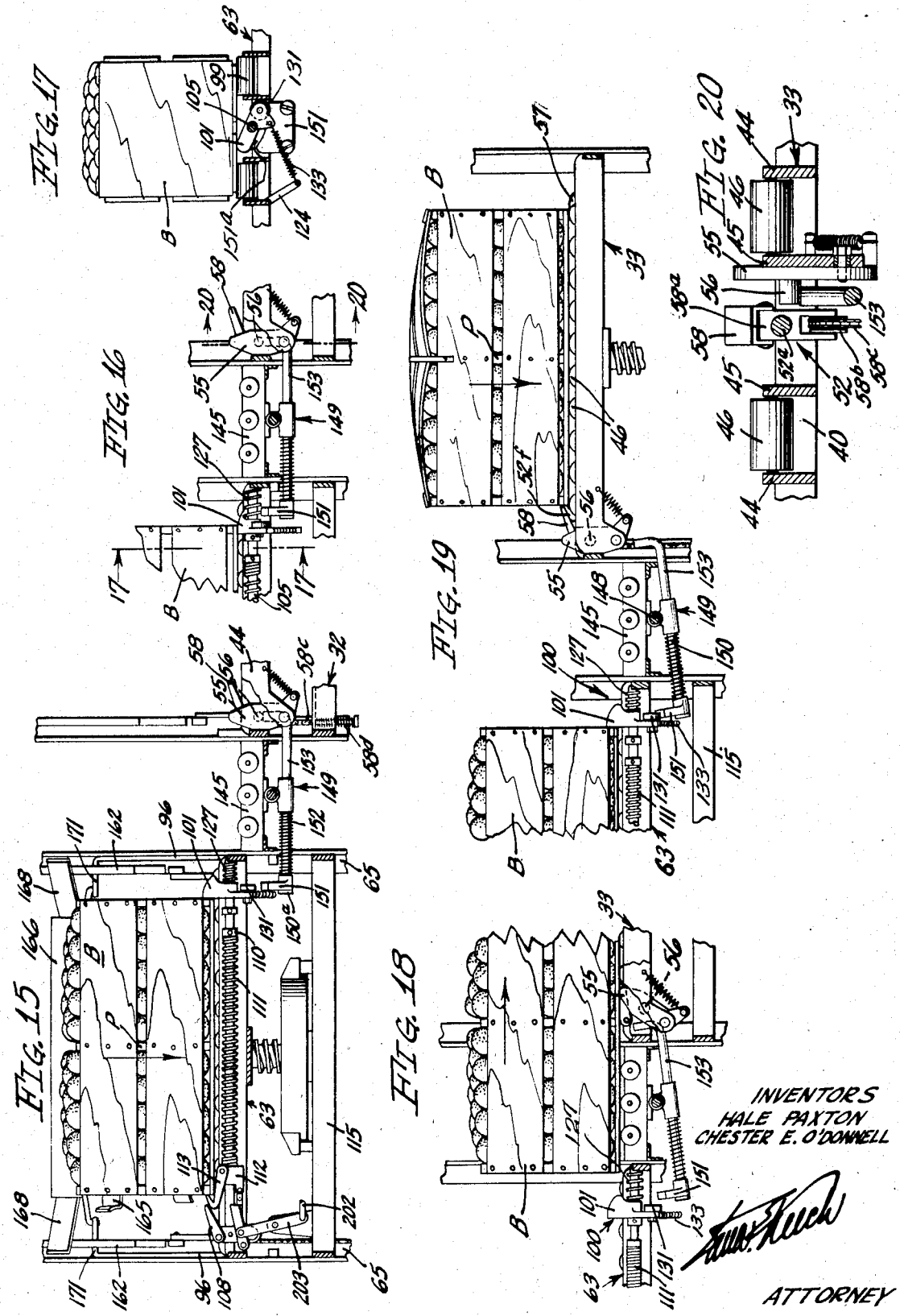

2,132,516

UNITED STATES PATENT OFFICE 2,132,516

METHOD OF AND APPARATUS FOR PACKAGING FRESH WHOLE FRUITS AND THE LIKE

Hale Paxton, Santa Ana, and Chester E. O'Donnell, Placentia, Calif., assignors, by mesne assignments, to Food Machinery Corporation, a corporation of Delaware Application April 24, 1935, Serial No. 17,970

12 Claims. (Cl. 1—10)

Our invention relates to the packaging of fresh vegetables and fruits and has particular utility where crates are overfilled with such products and thereafter lidded with the produce and the lid bulging upwardly.

Such packs are known as "crown" or "overfilled" packs and the pressure with which it is necessary to force the lid against the product frequently damages the latter if it is of a tender or perishable nature. In the fresh apple and citrus fruit shipping industries, one of the most common sources of decay of the fruit en route to market is damage done to the product by this lid pressing operation.

It is accordingly an object of our invention to provide a method of and apparatus for packaging fresh fruit and vegetables which will eliminate the aforementioned source of decay and yet permit the continued use of crown packs in packaging such commodities.

Other objects are to provide such a method and apparatus which will prevent the damaging of citrus fruit against the center partition in a standard citrus box incidental to the lidding of an overfilled pack of fruit in such a box; to provide such an apparatus having automatic means for operating the same; to provide a novel flushing mechanism for use in such an apparatus; and to provide a novel article conveying and controlled delivery mechanism.

The manner in which the foregoing objects are accomplished as well as further objects and advantages will be made manifest in the following description taken in connection with the accompanying drawings in which:

Fig. 1 is a front elevational view of a preferred embodiment of the apparatus of our invention.

Fig. 2 is a horizontal sectional view taken on the line 2—2 of Fig. 1.

Fig. 3 is an enlarged fragmentary perspective view illustrating the details of the control mechanism on the prepresser.

Fig. 4a is a fragmentary diagrammatic view taken in the direction of the arrow 4a in Fig. 3 illustrating the neutral position of the overthrow mechanism controlling the elevating of the elevator table in the prepresser of the invention.

Fig. 4b is a view similar to Fig. 4a showing said overthrow mechanism positioned as when the said table is being lowered.

Fig. 4c is a figure similar to Fig. 4a showing said overthrow mechanism positioned as when the latter is causing the elevator table in the prepresser to be elevated.

Fig. 5 is a horizontal sectional view taken on the line 5—5 of Fig. 1 and illustrating the flushing or gathering mechanism of the prepresser in extended or open position.

Fig. 6 is a fragmentary view similar to Fig. 5 illustrating said gathering mechanism in inward or closed position in which it gathers overflow product inwardly from over the vertical walls of the box.

Fig. 7 is a fragmentary vertical transverse sectional view taken on the line 7—7 of Fig. 1 and illustrating the preferred form of center guard for shifting fruit and the like away from over the center position in an overfilled box.

Fig. 8 is a vertical transverse sectional view taken on the line 8—8 of Fig. 1 and illustrating the mechanism for controlling the discharge stop in the prepresser.

Fig. 9 is a longitudinal vertical sectional view taken on the line 9—9 of Fig. 2 and illustrates the situation where a box has just been received into the prepresser and come to rest between the end stops.

Fig. 9a is a fragmentary view illustrating the shifting of the stop operating cam when a box enters the prepresser just preceding the situation shown in Fig. 9.

Fig. 10 is a view similar to Fig. 9 and illustrating the situation which exists after the elevation of the table has started in the prepresser with the gathering members partly moved inwardly.

Fig. 11 is a fragmentary view similar to Fig. 10 illustrating the situation which exists after the gathering members are moved entirely into their inward or closed position and after the center guard has engaged the center partition of the box but before the pad on the compressing plate has engaged the upper layer of fruit in the box.

Fig. 12 is a view similar to Fig. 11 illustrating the completion of the pressing of the fruit in the box in the prepresser, showing how the upper layer is given an arched contour and all the fruit pressed down into the box without damaging the fruit.

Fig. 13 is a diagrammatic cross sectional view of a modified form of center guard adapted to be used in the apparatus of our invention, this view showing the center guard collapsed and just after it has entered the space immediately above the partition of the box.

Fig. 14 is a view similar to Fig. 13 showing the aforesaid modified form of center guard in expanded condition over said center partition.

Fig. 15 is a view similar to Fig. 9 illustrating the controls only with the prepresser table coming down and showing the ejector dog shifting the box and the discharge stop to position the latter over the operating cam therefor.

Fig. 16 is a fragmentary operation view illustrating the situation at the instant of completing the downward movement of the prepresser table in progress in Fig. 15.

Fig. 17 is a transverse sectional view taken on the line 17—17 of Fig. 16.

Fig. 18 is a view similar to Fig. 15 illustrating the ejection of a box from the prepresser into the lidder with the consequent restoration of the discharge stop in the prepresser to its vertical position, and the automatic lowering of the stop operating cam into its inoperative position.

Fig. 19 is a view similar to Fig. 15 illustrating the situation where the table of the prepresser has arrived downwardly with a loaded box during the performance of a lidding operation in the lidder, this view showing the lidder table returning to its downwardmost position, upon arrival at which this table will shift the prepresser discharge stop operating cam against a roller on such stop to disengage this stop from the box on the prepresser table.

Fig. 20 is an enlarged fragmentary sectional detail taken on line 20—20 of Fig. 16 and showing the stop cam operating latch and lug.

Referring now specifically to the drawings, the preferred embodiment of the apparatus of our invention illustrated therein will be identified by the numeral 20. The apparatus 20 includes a lid pressing, nailing and strapping machine 21, a prepressing machine 22, and a box conveyor and feed mechanism 23 for supplying overfilled packed boxes to the machines 21 and 22.

The lid pressing, nailing and strapping machine 21 is substantially identical with the machine of this type disclosed in either copending application, Serial No. 688,104, filed September 5, 1933, by Hale Paxton as joint inventor with Gerald C. Paxton and Harry D. Benson, or it may be like the machine disclosed in copending application for U. S. Letters Patent, Serial No. 709,176, filed January 31, 1934, by the same three applicants. The machine 21 may apply round wire staples across the lids of boxes lidded therein as disclosed in the first of the above identified applications, or it may apply flat straps across the lids of boxes lidded therein as disclosed in the second of the above identified applications. Neither end tuckers, nor flushers, nor a crown sheet are employed in the machine 21, however, although end tuckers 30 are shown in Fig. 1, solely to support a lid L in said machine.

With the exceptions above-noted and to be indicated hereinafter the machine 21 may be like the machine described in either of the above identified copending applications. A brief description of this machine will be now given so as to facilitate an understanding of the part it plays in the apparatus 20. The machine 21 has a frame 32 and a nailing table 33 vertically reciprocable within the frame 32 by a power unit 34 controlled by a pedal 35, while mounted on the upper end of the frame 32 are nailing heads 36 and a strapper head 37.

The nailing table 33, a plan view of which is shown in Fig. 2, includes end cross bars 40 having upright guide bars 41 at their opposite ends for sliding within vertical angle iron members 43 of the frame 32. The end bars 40 are connected by longitudinal bars 44 and 45 upon which are mounted idle rollers 46. Pivotally mounted on the cross bars 40 and having operating mechanism exactly as shown in the first mentioned copending application are side flusher shafts 48, the shaft carrying no flushers however, but instead lateral box centralizers 49 and longitudinal box centralizers 50 which are brought into operative relation with a box on the table 33 when the table is elevated by inward swinging of shafts 48, as fully described in the first above mentioned copending application.

Mounted between the bars 45 is a box ejector and stop mechanism 52. The mechanism 52 includes a discharge stop 57 and a rebound box stop 58. Connecting the stop 57 with a downward extending arm 53 on one of the shafts 48 is a link 54 which swings the stop 57 down away from in front of a box on the table 33 each time the shafts 48 are swung inwardly by the lifting of the table. The link 54 is telescopic in construction and includes a rod 54a which has a head 54b at one end and a clevis 54c at the opposite end which pivotally connects to the arm 53. The rod 54a is slidable in lugs 54d provided on a member 54e which is pivotally connected to an arm 57a extending laterally from the hub of the stop 57. Coiled about the rod 54a between the clevis 54c and the lowest of the lugs 54d is an expansive spring 54f which tends to maintain the link 54 in its extended condition of greatest length as shown in Fig. 2a but which permits the telescoping of this link to reduce its length.

The stops 57 and 58 (Figs. 1, 2, 19 and 20) are mounted on a shaft 52a, the opposite ends of which are supported on the table bars 40. The stop 57 is rotatable on this shaft and is yieldably urged against a collar 52b, fixed on the shaft, by a short expansion spring coiled about the shaft. When a box is delivered onto the table 33, it depresses the stop 58 which is pivotally mounted on a block 58a fixed on the shaft 52a, the stop 58 (Fig. 20) being yieldably pressed upwardly into its stop position as shown in Fig. 1. When this box hits the stop 57, it compresses the spring 52c, the box at this time clearing the stop 58 and permitting the latter to be lifted by its hidden spring into its stop position as shown in Fig. 1. When the inertia of the box has been stopped by the compression of the spring 52c, this spring shifts the box backwardly against the stop 58, there still being a gap between stop 57 and the collar 52b when this takes place. Upon the operation of the lidding machine 21, as described in the first aforementioned copending application, the inward swinging of the shafts 48 by engagement of rolls 48a with cam tracks 48b shown in Fig. 2a, causes the stop 57 to be rotated by the link 54 until the stop is disposed downwardly from in front of the box. The pressure of the spring 52c against the stop 57 immediately forces this along the shaft 52a against the collar 52b so that the stop 57 is now disposed under the box. With the downward movement of the table 33, the shafts 48 are returned to their positions as shown in Fig. 2a by springs 53a connecting the lower ends of arms 53 on the shafts 48. Normally the box is still disposed over the stop 57 when the table 33 reaches its downwardmost position as shown in Fig. 2a, so that the stop 57 cannot be returned to its upward position by the link 54. This being the case, the link 54 telescopes as above described causing the compression of the spring 54f and when the box has entirely passed over the stop 57, this spring extends the link 54 to its full length and returns the stop 57 to its upwardmost position as shown in Fig. 2a.

The ejector and stop mechanism 52 also includes an ejector spring 52d, coiled about the shaft 52a and anchored at its forward end adjacent the collar 52b. The opposite end of the spring 52d connects to a block 52e slidable on the shaft 52a and carrying an ejector dog 52f which is constantly spring pressed into its upwardmost position as shown in Fig. 1. Pivotally mounted on the block 58a is a chain pulley 58b over which a chain 58c, connected to the block 52e, extends, this chain passing downwardly as shown in Fig. 15 and connects to a spring means 58d mounted on the frame 32 of the lidder 21. The spring means 58d takes up the slack in the chain 52c when the table 33 is in its downwardmost position and as the table rises with the box disposed between the stops 57 and 58, the chain 58c compresses the spring 58d to its limit and then pulls the block 52e with the ejector dog 52f thereon in a leftward direction until this dog is free to be spring pressed upwardly opposite the rear end of the box as shown in Fig. 19. Thus, when the box is freed from the stop 57 by the outward centralizers 50 and from the stop 57 by the outward swinging of the shafts 48, the power of the spring 52d is released against the box through the ejector dog 52f in ejecting the box from the lidder 21, this returning the dog 52f and spring 52d to the condition in which these are shown in Fig. 2.

Pivotally mounted on the inner face of a downward extension from the front one of the longitudinal bars 45 as shown in Figs. 1 and 2, is a spring pressed latch 55 having a lug 56 (Fig. 20) extending inward therefrom, this latch being positioned to be engaged by a box entering the machine 21, rocked about its axis and then disengaged by said box before the latter comes to rest upon the table 33 in its proper position. Leading from the discharge end of the machine 21 is a section of roller conveyor 59.

The prepresser 22 has a frame 62, a vertically reciprocable table 63 and a table elevating power unit 64, all of which are identical with the corresponding parts of the lid nailing and strapping machine 21 with the exceptions to be noted hereinafter.

Mounted upon upper ends of four angle iron corner posts 65 of the frame 62 is a presser plate assembly 66 including longitudinal bars 67 and 68 which are connected rigidly by angle iron beams 69 and center guard frame plates 70. Flexibly suspended at the lower end of threaded rods 72 are halves 73 of a compresser plate 74, there being a gap 75 between adjacent inner ends of said half plates 73. This gap is in vertical alignment with the space between the plates 70. The rods 72 are slidable vertically in apertures in the angle iron beams 69 and their vertical position is adjustable by means of lock nuts 76 on their upper ends. Coiled about the rods 72 between shoulders 77 at their lower ends and the beams 69 are expansive springs 78.

Secured to the lower face of each of the plates 73 is a relatively thick soft rubber pad 79.

Mounted for vertical sliding movement upon the plate 70 (Figs. 1 and 7) is a center fruit guard 80, the latter having a soft rubber body 81 which is properly reenforced by a metallic or wood core 82 and supported by a stem 83 comprising a pair of plates secured to opposite faces of the body 81 by a bolt 84 and extending upwardly between the plates 70 and guided thereon by four rollers 85 and prevented from downward movement by a pin 86 on the upper end of the stem 83. Pivotally secured to the body 81 are clevises 87 which extend upward through apertures in rotatably mounted slide blocks 88 and carry expansive coil springs 89, the effect of which is to continually urge the body 81 downwardly. From the foregoing description, it is clear that the centerguide 80 extends downwardly through the gap 75 between the individual presser plates 73 and is yieldable upwardly whenever the resistance of the springs 89 is overcome. It is also to be noted that the presser plate 74 and the thick soft rubber pad 79 provided upon its lower face presents a concave, or downwardly arched lower surface 90.

As above stated, the nailing table 63 is supported on and vertically reciprocable by the power unit 64 in the same manner as described in the first above mentioned copending application. As shown in Fig. 2, the table 63 is substantially similar to the table 33 of the machine 21, and both of the tables in their downwardmost positions are on the same level. Parts of the table 63, like corresponding parts of the table 33, are as follows: end bars 95 having upwardly extending guide arms 96 and connected by longitudinal bars 97 and 98, between which are mounted rollers 99, there being an ejector and stop assembly 100 mounted between the bars 98 which is substantially like the assembly 52 excepting as to the means of operating the discharge stop 101.

The ejector and stop assembly 100 (Fig. 3) includes a shaft 105 which is supported as by having its opposite ends welded upon the end bars 95 of the table. This shaft supports a block 106 fixed thereto, said block carrying a chain pulley 107, underneath the bar 105, and a box rebound stop 108 pivotally mounted on said block and yieldably spring pressed upwardly into the position in which it is shown in Fig. 3. Fixed upon the shaft 105 adjacent the opposite end of the table 63 is a spring anchor collar 110 to which is anchored a heavy contractible spring 111 which is coiled about the shaft 105. The opposite end of this spring is connected to a slide block 112 on which is pivotally mounted an ejector dog 113, this being yieldably urged upwardly into the position in which it is shown in Fig. 3 by a small concealed spring on said slide block.

The frame 62 (Fig. 3) includes a longitudinally disposed channel iron member 115 and a flexible chain 116 extends from the slide block 112, over the pulley 107, and downwardly through a suitable aperture in the member 115 where it is yieldably held by a spring means 117 (Fig. 9).

Extending downwardly from one of the longitudinal bars 97 as shown in Fig. 8 is a spring bracket finger 124. As shown in Fig. 3, the discharge stop 101 has a hub 126 which, with a strong, stiff compression spring 127 is trapped on the shaft 105 between the adjacent end bar 95 and a stop collar 128. As shown in Fig. 8, the hub 126 has a downwardly extending bearing arm 129 which is apertured to receive a stub shaft 130 on which a cam roller 131 is rotatably mounted. The bearing arm 129 has a lateral extension 132 which is connected by a contractile spring 133 to the spring bracket arm 124. The spring 133 yieldably maintains the discharge stop 101 in upright position as shown in Figs. 1, 2, 3, 5, 8, 9 and 10.

As shown in Figs. 1 and 2, the machines 21 and 22 are connected by a short idle roller conveyor section 145, the opposite ends of which are secured to the frame 32 and 62 of these machines respectively. Provided on the conveyor section 145 are bearing blocks 147 which carry a shaft 148 having mounted thereon a cam supporting rocker 149. The rocker 149 has arms 150 which slidably support a cam 151 as shown in Figs. 1, 2, 5, 8, 9 and 10. Light coil springs 152 on the arms 150 maintain the cam 151 against cap screws 150a screwed into the ends of arms 150. The rocker 149 also has an arm 153 which extends upwardly within the structure of the table 33 when this is in its lowermost position and is engaged by a horizontal surface on the latch 55 whenever the latter moves downwardly with the table 33 into its lowermost position as shown in Fig. 1. Whenever the arm 153 is disengaged by the latch 55, the rocker 149 rocks by gravity owing to the weight of cam 151 so as to lower the latter into its lowermost position in which it is shown in dotted lines in Fig. 8.

The table 63 has flusher shafts 160 which are actuated in identically the same manner as illustrated in the first of the aforementioned copending applications, that is by rollers 161 and cam tracks 162 (see Fig. 8). These shafts have upwardly extending arms 163 carrying lateral box centralizing members 164, longitudinal box centralizing members 165 and side flusher blades 166.

Pivotally mounted on opposite ends of each flusher 166 is an end flusher 168 having an operating arm 169 which is connected by a link 170 to a goose neck 171 formed on the upper end of the adjacent table guide member 96. When the table 63 is elevated and the rollers 161 strike the cams 162, the shafts 160 are rotated, swinging the flushers 166 inwardly. The goose necks 171, of course, move upwardly with the table 63 and, with the inward movement of the flushers 166, the end flushers 168 are swung into end flushing positions as shown in Fig. 6 by the links 170, the end flushers reaching these positions just as the side flushers 166 reach their full inward flushing positions shown in this figure.

The table 63 also carries an apertured upward limit control finger 175 (Figs. 1 and 3) and a downward limit control cam 176. Carried on the inner face of one of the longitudinal bars 98 of the table 63 is a low voltage box delivery control switch 177 (Figs. 1, 2 and 3) having a switch finger 178.

Extending forwardly from the channel frame member 115 (Fig. 3) is a frame bracket 180 and a switch control shaft 181 is pivotally mounted between this bracket and a member 182 of the frame 62. The control arm 181 has arms 185, 186, 187, 188 and 189 provided thereon. The arm 185 is connected by a link 190 (Fig. 1) to an eye 191 which surrounds the stem 192 of a switch 193 which controls the power elevating mechanism 64 and which is constructed and operates in exactly the same manner as the corresponding switch in the first above mentioned copending application. The stem 192 has collars 194 and 195 which are disposed above and below the eye 191.

The arm 186 connects to the lower end of a control rod 196 (Fig. 1) which extends upward through the aperture in the finger 175 and has its upper extremity guided vertically by a guide 197 provided on the overhead frame plate 67 as shown in Fig. 1. The rod 196 has an upward limit collar 198 provided thereon as shown in Fig. 1, the position of this collar on the rod 196 being adjustable, and being adapted to be engaged by the upward limit finger 175 on the table 63 as this table approaches its uppermost position to reverse the switch 193 and the operation of the elevator mechanism 64, this causing the table to be lowered.

The arm 187 as shown in Figs. 1 and 3 is adapted to be engaged by the downward limit control cam 176 on the table 63 as the latter approaches its downwardmost position so as to rock the shaft 181 and operate the switch 193 to halt the downward movement of the table 63. The arm 188 is connected through a link 200 with a full bell crank 201 which is in turn connected by a link 202 to a lever 203 pivotally mounted on a bracket 204 which is supported on the channel member 115. The upper end of the lever 203 has a dog 205 pivotally mounted thereon as shown in Fig. 3, this dog being yieldably held by a spring 206 in the position shown. The arm 189 has a pin 210 at its lower end which is connected by a contractile spring 211 to a pin 212 provided on the bracket 180. Also provided on this bracket are stops 213 and 214.

The box conveying and feed mechanism 23 is best shown in Figs. 1 and 2 and includes a horizontal belt conveyor system for collecting the packed boxes to be handled in the apparatus 20, this system being represented by the conveyor 220 and being driven by a motor 221 connected to this conveyor. This motor is controlled by switches 222 and 223 having arms 224 and 225 which are positioned as shown in Figs. 1 and 2 so as to be engaged by boxes travelling upon the conveyor 220 and upon a short section of idle conveyor 227 located between the conveyor 220 and the machine 22. The motor 221 is driven by power transmitted through switches 222 and 223 with the latter connected in parallel so that this motor runs continuously excepting when both arms 224 and 225 are engaged by boxes as aforesaid to deenergize the motor 221.

Mounted so as to extend slightly above the uppermost surface of the idle roll conveyor section 227 just at the entrance to the machine 22 is a feed roller 230 which is power driven by a motor 231, current being supplied to said motor through the switch 177, the motor being deenergized whenever the arm 178 is depressed by a box resting on the table 63. Owing to the necessity for the table 63 to reciprocate vertically in the operation of the machine 22, switch 177 is, of course, connected to the motor 231 through a flexible cord.

*Operation*

The operation of the apparatus 20 in carrying out the method of our invention is as follows. Electricity is first supplied to the various switches for running the various motors controlled thereby. Assuming the machines 21 and 22 and the conveyors 220 and 227 to be empty, the conveyor 220 is thus set in motion by the motor 221 and the feed roller 230 is rotated by its motor 231. As boxes B travel along the conveyor 220 onto the idle roll conveyor section 227 so as to extend onto the feed roller 230, this feed roller picks up the foremost box somewhat and delivers it at an accelerated speed onto the table 63 of the machine 22. The rapidity of this delivery causes the box, upon engaging the discharge stop 101 to compress the spring 127 measurably as shown in dotted lines in Fig. 9, and as the inertia of the box is overcome, the latter is repelled back against the stop 108 which in the meantime has been lifted by its spring into position at the rear of the box. With this rearward movement, the box also engages the dog 205 and shifts this rearwardly thereby rocking the lever 203 to swing the lower end of this forwardly and, through the linkage 200, 201 and 202 and the arm 188, rocking the shaft 181 to swing the overthrow arm 189 from the position in which it is shown in Figs. 3 and 4a to the position in which the latter arm is shown in Fig. 4c. It will be noted that in this movement of the arm 189 the axis of spring 211 is shifted across the axis of the shaft 181 to bring the arm 189 against stop 213 so that the spring 211 now retains the shaft 181 in the position into which it was just shifted. This rotation of the shaft 181 lifts upon the link 190 and the eye 191 (see Fig. 1) so as to lift on the collar 194 thereby drawing upwardly the stem 192 of the switch 193. This actuates the switch to set in motion the elevator mechanism 64 thereby starting to move the elevator table 63 upwardly. Owing to the fact that the spring 211 holds the arm 189 in the position in which it is shown in Fig. 4c this upward movement of the table 63 will now continue until some positive force has been applied to throw out the switch 193.

As box B moves onto the table 63 and over the switch 177, it engages the switch arm 178 and shuts off the motor 231, thus stopping rotation of the feed roller 230. Any box delivered onto the conveyor section 227 therefor while the box B is still resting on the table 63 will merely come to rest with its forward end resting on the roller 230 as box B is shown in Fig. 1. When resting in this manner, the foremost box has moved entirely off the conveyor 220 so as not to interfere with continued operation of the latter. When in this position, the foremost box engages the arm 225 and swings it so as to shut off the switch 223. If, while this box remains in this position, another box arrives at the discharge end of the conveyor 220 so as to engage and swing the arm 224 and shut off the switch 222, this deenergizes the motor 221 and causes the conveyor system terminating with the conveyor 220 to be halted. This halting of the conveyor 220 continues until the foremost box is subsequently delivered into the machine 22, as will be described hereinafter.

It is to be noted in Fig. 9 that when the box B arrives in the machine 22, the fresh whole fruit F is packed therein in a series of layers so that the uppermost layer extends considerably above the top of the box and overlies the sides and ends of the vertical walls of the box as well as a metal partition P thereof. The pack illustrated in the drawings is that of oranges which are very snugly packed in the box in alternate layers of a uniform geometric pattern prescribed by the regulations of the California Fruit Growers Exchange. The snug packing of the fruit in the box in this manner renders it extremely difficult to press a lid on the box without damaging the upper layer of the fruit by the pressure of the flat unyielding lid thereagainst. As above forestated, it is an object of this invention to provide a method and apparatus for accomplishing this compression without injury to the fruit.

As the table 63 rises, engagement of the rollers 161 with cams 162 as shown in Figs. 8 and 10, causes the side and end flushers to be rotated inwardly so as to eventually reach their flushing positions (Figs. 6 and 11). As the table 63 with the box B resting thereon continues upwardly from the position in which it is shown in Fig. 11 to the position in which it is shown in Fig. 12, the lower surface 90 of the pad 79 comes into contact with the pieces of fruit in the upper layer and presses these directly downwardly as shown in Fig. 12 giving a uniform arch to the upper layer of fruit in each of the boxes thus treated. Furthermore, this is accomplished by applying pressure to a substantially extensive arcuate area on each of the pieces of fruit in the upper layer. The length of the period over which this pressure is applied to the uppermost layer of fruit in achieving the compression shown in Fig. 12 and the amount of pressure thus applied is determined by adjustment of the nuts 76 on the threaded rods 72 and by the positioning of the collar 198 on the control rod 193 so as to select the height to which the table has been lifted before the switch 193 is reversed thus causing the elevator mechanism 64 to cease elevating the table 63 and commence drawing the latter back downwardly.

While the side and end flushers completely protect the upper layer of fruit from being damaged against the ends of the sides of the box B during the pressing operation just described, they do nothing against the fruit being pressed against the center partition P. The center guard 80, however, becomes inserted into the space just above the center partition by the upward movement of the table 63 as shown in Fig. 10. With further upward movement of the table, the rubber body 81 of this guard is expanded as shown in Figs. 11 and 12 so as to completely shift adjacent pieces of fruit away from over the partition P. The center guard 80 accommodates itself to the upward movement of the box by the yielding of the spring 89 shown in Fig. 7 and the upward sliding of the stem 83 between the plate 70 and rollers 85. As the table 63 returns downward, the center guard, of course, gradually collapses to its original condition as shown in Fig. 9 and is then withdrawn from the space above the partition P.

In Fig. 13, we have shown a modified form of center guard 240, which is mounted on a plurality of rods 241 which are supported in blocks 242 provided on the center guard supporting plate 70. The upper ends of these rods are adjustably held in place by set screws 243 and their lower ends are provided with rollers 244 above which is a collar 245. The rods 241 support a pair of flusher plates 246 and 247 which are pivoted together at 248 and which have interfitting fingers 249 at their lower ends. A semi-cylindrical leaf spring 250 has apertures receiving the rods 241 and extending downwardly around the upper ends of the flusher plates 246 and 247, inner grooves in these plates tend to keep the latter collapsed together as shown in Fig. 13. Coiled about each of the rods 241 is an expansive spring 252 which continually urges the springs 250 downwardly. Fig. 13 shows the insertion of the guard 240 into the space just above the partition P between adjacent pieces of fruit, the guard at this time being in completely collapsed condition. Fig. 14 illustrates the condition of the guard 240 with the box in its uppermost position. Shortly after contact of the partition P with the lower end of the guard 240 shown in Fig. 13, the upward movement of the partition causes the complete expansion of the metal plates 246 and 247 into the positions in which they are shown in Fig. 14. During the subsequent upward movement of the box, the members 246 and 247 and the leaf spring 250 merely move further upwardly on the rods 241, this of course compressing the spring 252. The rods 241 do not move vertically, but are held in fixed positions determined by the positions of the nuts 243. Upon the return downward of the box, the springs 252 cause the plates 246 and 247 and associated parts to follow the partition downwardly until they are supported on the collar 245 in collapsed position as shown in Fig. 13.

As the table 63 rises, the spring means 117 shown in Figs. 9 and 10 is compressed and then draws downwardly on the chain 116 to draw the slide block 112 leftward and stretch spring 111. This carries the ejector dog 113 to the left as shown in Fig. 10 until it comes up underneath the reversal stop 108 opposite the rear end of box B. As the elevator table starts downwardly, the dog 113 is shifted by the spring 111 against the rear end face of box B and the fact that the box is as yet trapped longitudinally by centralizers 165 and the presence of stop 101 in the path along which the box must be ejected, prevents further contraction of the spring 111 for the time being. As shown in Fig. 15, the centralizers 164—165 and flushers 166—168 are withdrawn from their embrace with the box B as the rollers 161 roll downwardly from off the lower sloping portions of the cams 162.

With this release of the box B from all restraint but that of the stop 101, the powerful pressure exerted against the box by the spring 111 compresses the weaker spring 127 between the discharge stop 101 and the adjacent end bar 95 of the table 63, this movement of the box taking place a short distance before the table 63 reaches its lowermost position. This shifting of the discharge stop 101 along the shaft 105 shifts the roller 131 longitudinally to position it above the cam 151 with the result that as the table 63 completes its downward movement, the roller 131 engages the cam 151 on its cam surface 151A which rocks the discharge stop 101 about the shaft 105, this resulting in the release of the box B, as shown in Fig. 16, followed by the ejection therefrom by the ejector 100, so as to impel this box over the idle conveyor 145 and into the machine 21 as shown in Fig. 18.

As the box enters the machine 21, it engages latch 55 and swings it forwardly thus shifting the lug 56 on the latch 55 (Fig. 20) away from over the arm 153 of the cam rocker 149. This disengagement permits the weight of the cam 151 (Fig. 18) to rock the rocker 149 to lower the cam 151 out of operative relation to the roller 131 on the stop 101. However, at the very instant the stop 101 is rotated downwardly away from in front of the box B, as shown in Fig. 16, the spring 127 expands to push the stop 101 inwardly into contact with the collar 128. Thus, when the box B has passed over the stop 101, the roller 131 on said stop is not only rendered free from cam 151 by the lowering of the latter as aforesaid, but is also now out of alignment with this cam by the response above noted of the stop 101 to the spring 127. The stop 101 is thus doubly free to respond to its normalizing spring 133 which returns the stop to its upright position as shown in Fig. 18.

From the foregoing, it is clear that the delivery of a box onto the table 33 in the lidder 21 disengages the latch 55 from the cam rocker arm 153 so as to permit the cam 151 to drop into its inoperative position relative to the stop 101. It is likewise clear that the cam 151 must be raised into operative position before a box may again be discharged from the prepresser 22. The only way in which the cam 151 can be thus raised is by the elevation of the table 33 of the lidding machine 21 a sufficient distance so that on its return downward the lug 56 on the latch 55 will engage and rock the cam rocker 149 to lift the cam 151.

A reciprocation of the table 33 having this effect may be accomplished by manipulating the pedal 35, of course, without lidding a box resting on this table. However, in the normal operation of the apparatus 20, no such partial reciprocation of the table 33 would take place. Instead, each time a box is delivered to the machine 21 and is centralized longitudinally by the stops 57 and 58, the operator, after placing a lid L in the machine and inserting a strap in the strapper head 37, steps on the pedal 35 causing the elevating mechanism 34 to lift the table 33 against the nailing heads 36 and the strapper head 37 so as to apply a lid to the box with the ends of the lid engaging the ends of the box, nail the lid ends to the box ends, place the strap over the middle of the cover, and secure the ends of the strap to the sides of the box. When this is accomplished, the operator releases his foot from the pedal 35 which automatically results in the reversal of the motor in the elevating mechanism 34 thereby withdrawing the table 33 downward to its lowermost position as shown in Fig. 1. The stop 57 is rotated out of stop position with the downward movement of the table 33 by suitable linkage connecting this stop to the flusher shafts 48, and the longitudinal box centralizers 50 are also withdrawn by the rotation of such shafts to non-impeding positions as shown in this figure, whereupon the ejector dog of the mechanism 52 ejects the lidded and strapped box from the table 33 onto the gravity conveyor section 59.

Whenever a complete reciprocation of the table 33 takes place in lidding a box, a return of the table to its downwardmost position as shown in Fig. 1 always results in the lug 56 on the latch 55 engaging the cam rocker 149, this lifting the cam 151 into operative position. Whenever this occurs, of course, a lidded box is just being ejected from the table 33, leaving the latter ready to receive another box to be lidded. If, when the table 33 thus moves downwardly, the table 63 of the prepresser 22 is in its downwardmost position with a box resting thereon and waiting to be ejected therefrom, the upward movement of the cam 151 resulting from the return of the table 33 to its lowermost position will cause the cam 151 to engage the roller 131 and rotate the stop 101 out from in front of the box B on the table 63 in exactly the same manner as, and with the same results as above described, where the cam 151 was latched in raised position and was then engaged by the roller 131 as the table 63 returned to its lowermost position. That is, in either case, the cam 151 rotates the stop 101 out from in front of the box on the table 63 allowing the box to be ejected by the ejector 100, discharging the box rapidly from the machine 22 into the machine 21.

As shown in Fig. 9a, whenever the cam 151 is in raised position at the time a box is being received into the prepresser 22, engagement of the box travelling at considerable speed with the discharge stop 101 compresses the spring 127 and moves the roller 131 into contact with the cam 151 so as to shift the latter longitudinally on the cylindrical arms 150 on which this cam is mounted, this movement of the cam causing a slight compression of the coil springs 152 surrounding said arms. With the expansion of the spring 127 to return the box backwardly against the stop 108, the stop 101 and the cam 151 return substantially to the positions in which these are shown in Fig. 9.

What we claim is:

1. A method of packaging fresh whole pieces of citrus fruit in a standard citrus box divided into two compartments by a middle partition which comprises snugly packing said pieces of citrus fruit into said compartments, in complementary layers of uniform geometrical pattern the uppermost layer extending well above the top of the box and overlying said partition, shifting and holding the pieces in said upper layer away from over said partition, simultaneously applying a substantial downward pressure to practically all the pieces in said upper layer to compress said product downward in said box and impart an arched conformation to said upper layer, applying a lid across said upper layer to conform thereto, and securing the ends of the lid to the ends of said box.

2. A method of packaging fresh whole pieces of citrus fruit in a standard citrus box divided into two compartments by a middle partition which comprises snugly packing said pieces of citrus fruit into said compartments, in complementary layers of uniform geometrical pattern the uppermost layer extending well above the top of the box and overlying said partition and outer walls of said box, shifting and holding the pieces in said upper layer away from over said partition and inwardly away from over said outer walls of said box, simultaneously applying a substantial downward pressure to practically all the pieces in said upper layer to compress said product downward in said box and impart an arched conformation to said upper layer, applying a lid across the said upper layer to conform thereto, and securing the ends of the lid to the ends of said box.

3. In combination: means to compress in a box an over-filled pack of whole fresh fruit or the like and impart to the upper layer thereof an arched conformation; means for thereafter applying a lid over said upper layer with the ends of said lid against the ends of said box and with the middle of said lid bulging upwardly to conform to said upper layer; and means automatically operating in timed relation with the discharge of a box from said lid applying means to transfer a box from said compressing means into said lid applying means.

4. In combination: means to compress in a box an overfilled pack of whole fresh fruit or the like and impart to the upper layer thereof an arched conformation; means for thereafter applying a lid over said upper layer with the ends of said lid against the ends of said box and with the middle of said lid bulging upwardly to conform to said upper layer; means automatically delivering a box into said compressing means in response to the discharge of a box therefrom; means automatically actuating said compressing means in response to the delivery of a box thereto; and means automatically operating in timed relation with the discharge of a box from said lid applying means to transfer a box from said compressing means into said lid applying means.

5. In combination: means to compress an overfilled pack in a box containing fruit or the like when said box is delivered to said means; means for receiving said box from said compressing means and applying a lid to said box with the ends of said lid against the ends of said box; and means automatically operating in timed relation with the discharge of a box from said lid applying means to transfer a box from said compressing means into said lid applying means.

6. In combination: means to compress an overfilled pack in a box containing fruit when said box is delivered to said means; means for receiving said box from said compressing means and applying a lid to said box with the ends of said lid against the ends of said box; means automatically delivering a box into said compressing means in response to the discharge of a box therefrom; means automatically actuating said compressing means in response to the delivery of a box thereto; and means automatically operating in timed relation with the discharge of a box from said lid applying means to transfer a box from said compressing means into said lid applying means.

7. In combination: means to compress in a box an overfilled pack of whole fresh fruit or the like and impart to the upper layer thereof an arched conformation; means for automatically gathering portions of said pack inward away from over vertical walls of said box and holding said portions thus during said compressing operation; means for thereafter applying a lid over said upper layer with the ends of said lid against the ends of said box and with the middle of said lid bulging upwardly to conform to said upper layer; and means automatically operating in timed relation with the discharge of a box from said lid applying means to transfer a box from said compressing means into said lid applying means.

8. In combination: means to compress an overfilled pack of fresh whole fruit in a box without injuring said fruit and to provide the upper portion of said pack with a predetermined arched conformation; means for applying a lid across the upper end of said pack and securing the ends of said lid to the ends of said box; manual means for controlling the operation of said lidding means; and control means automatically functioning to cause said compressing means to perform its operation on an overfilled pack in a box prior to the delivery of said box to said lidding means and after the performance of said compressing operation deliver said box to said lidding means in timed relation with the operation of the latter.

9. In combination: a table; a yieldable far-end stop on said table; means to feed a box onto said table at sufficient speed to cause said box to contact said end stop and cause said end stop to yield, stop said box, and then return said box rearwardly; means for halting said return movement of said box; means for performing an operation on said box; and means actuated by said return movement of said box to set in action said operation performing means.

10. In combination: a table; stop means for positioning an article thereon; means for elevating said table to perform an operation on an article carried thereon and for returning said table downwardly to its original position at the conclusion of said operation; means responsive to the proper positioning of said article on said table to start the elevation of said table by said table moving means; and means responsive to the completion of said operation to initiate the return of said table downwardly by said table moving means.

11. In combination: a table; stop means for positioning an article thereon; means for elevating said table to perform an operation on an article carried thereon and for returning said table downwardly to its original position at the conclusion of said operation; means responsive to the proper positioning of said article on said table to start the elevation of said table by said table moving means; means responsive to the completion of said operation to initiate the return of said table downwardly by said table moving means; and means for automatically ejecting said article from said table as said table returns to its downwardmost position.

12. A method of packaging fresh whole citrus fruit and the like which comprises: packing the product into its box with the individual pieces thereof snugly pressed into said box in a plurality of superimposed layers, alternate layers of which are placed in the box in the same regular geometric pattern, the uppermost layer extending well above the top of said box; moving the outer edge pieces of said uppermost layer of fruit inwardly from over the vertical walls of said box and holding said edge pieces of fruit thus inwardly disposed; applying a substantial pressure resiliently to a substantial upwardly disposed arcuate area of the surface of each of the pieces of fruit in said uppermost layer, said pressure being applied vertically downwardly against all of said pieces of fruit so that, without injury to the individual pieces of fruit, these are shifted downwardly, the entire pack more snugly compressed in the box, and a contour is given said upper layer to adapt the latter to have a cover applied thereover and the ends nailed to the ends of said box without substantial further downward compression of said fruit; relaxing said pressure from said uppermost layer of fruit; applying a lid in arched conformation across said upper layer of fruit and in contact therewith; and securing the ends of said lid to the ends of said box.

HALE PAXTON.
CHESTER E. O'DONNELL.